US006783161B2

(12) United States Patent
Halama

(10) Patent No.: US 6,783,161 B2
(45) Date of Patent: Aug. 31, 2004

(54) CONNECTION DEVICE FOR A FLUID DUCT

(75) Inventor: Wolfgang Halama, Bissingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/182,216

(22) PCT Filed: Aug. 24, 2001

(86) PCT No.: PCT/EP01/09773
§ 371 (c)(1),
(2), (4) Date: Jul. 25, 2002

(87) PCT Pub. No.: WO02/42676
PCT Pub. Date: May 30, 2002

(65) Prior Publication Data
US 2003/0001383 A1 Jan. 2, 2003

(30) Foreign Application Priority Data
Nov. 25, 2000 (DE) ................... 200 20 052 U

(51) Int. Cl.$^7$ .............................................. F16L 37/00
(52) U.S. Cl. ..................................... 285/308; 285/340
(58) Field of Search ............................... 285/308, 340, 285/400, 382, 321

(56) References Cited

U.S. PATENT DOCUMENTS 4,630,848 A * 12/1986 Twist et al. ................. 285/340
4,919,457 A * 4/1990 Moretti ....................... 285/308
4,951,975 A * 8/1990 Bartholomew .............. 285/308
4,978,150 A * 12/1990 Schoot ........................ 285/321
5,292,157 A * 3/1994 Rubichon .................... 285/308
5,487,572 A * 1/1996 Combot-Courrau et al. ..... 285/308
5,911,443 A * 6/1999 Le Quere .................... 285/340
6,145,887 A * 11/2000 Cambot-Courrau ......... 285/308
6,312,019 B1 * 11/2001 Nakazumi et al. .......... 285/308
6,612,623 B2 * 9/2003 Salomon-Bahls ........... 285/308

FOREIGN PATENT DOCUMENTS

| DE | 100 05 870 A1 | 8/2000 | |
|---|---|---|---|
| EP | 0 264 102 A1 | 4/1988 | |
| EP | 268251 | * 5/1988 | ................. 285/308 |
| EP | 0 723 103 B1 | 7/1996 | |
| GB | 2 080 467 A | 2/1982 | |

* cited by examiner

Primary Examiner—David Bochna
(74) Attorney, Agent, or Firm—Hoffmann & Baron, LLP

(57) ABSTRACT

A connection device for a fluid duct includes a metallic holding body, a sleeve-like insert body, and a synthetic resin retaining ring. The metallic holding body is formed with a socket having an inner periphery formed with an annular groove. The sleeve-like insert body has an outer periphery and is configured to be plugged into the socket. The synthetic resin retaining ring is fixed in the annular groove so that the retaining ring will bear axially against the holding body. At least one projection is provided on the outer periphery of the insert body for biting into the retaining ring upon insertion of the insert body into the socket.

25 Claims, 2 Drawing Sheets

CONNECTION DEVICE FOR A FLUID DUCT

This application is the U.S. National Phase of International Application Number PCT/EP01/09773 filed on Aug. 24, 2001, which is incorporated herein by reference.

BACKGROUND OF THE INVENTION

1. Field of the Invention

The invention relates to a connection device for a fluid line, comprising a connection unit having a sleeve-like insert body fitted by being plugged in a socket in a metallic holding body, anchoring means, constituted by one or more projections, being provided on the outer periphery of the insert body for anchoring in the socket.

2. Description of the Prior Art

Connection devices of this type, as described for example in the European patent publication 0 723 103 B1, are utilized to be able to connect fluid lines with fluid power equipment such as a valve or drive or the like. In the case of the connection device in accordance with the said European patent publication 0 723 103 B1 a connection unit is provided, whose component in the form of an insert body is inserted into the socket of a holding body and anchored in this socket. The holding body is in this case directly designed in the form of a component of the fluid power equipment, fitting by plugging taking place so that projection-like anchoring means provided on the outer periphery of the insert body bite into the wall of the socket and produce an interlocking connection so that the insert body is held immovably in the socket in the axial direction.

Connection devices of this type do possess the advantage that during fitting the connection unit it is possible to do without any screwing operation. On the other hand it has however turned out that firm holding of the insert body in the holding bodies of metal—for example of injection cast aluminum—can not be ensured under all states in a reliable manner, because the anchoring means constituted by one or more projections are subject to such deformation on biting into the hard material of the holding body or are even shorn off, that same are unable to perform the anchoring function or not perform it to the required degree.

OBJECT AND SUMMARY OF THE INVENTION

Accordingly one object of the present invention is to provide a connection device of the type initially mentioned which ensures firm anchoring, even in the case of a holding body consisting of metal, in the socket after fitting therein by plugging.

In order to achieve such aim the connection device comprises a retaining ring of synthetic resin material, which is fixed in an annular groove, provided at the inner periphery of the socket, of the holding body, so that same may bear axially in either direction in relation to the holding body, the insert body being inserted coaxially into the retaining ring and having its anchoring means biting into the synthetic resin material of the holding ring.

This means that conditions are created in the socket of the metallic holding body as regards the anchoring measures which are comparable with those in the case of a holding body consisting of synthetic resin material, the insert body not having its anchoring means biting into the pertinent hard material of the metallic holding body but rather into the softer synthetic resin material of the retaining ring placed in the socket. The retaining ring itself is so axially locked on the holding body that it can bear in either axial direction on the holding body, something which ensures a firm retention of the insert body both in the case of regular fitting by plugging as part a press fitting and also in the case of later tension loading. The insert body is indirectly anchored, that is to say by the intermediary of the retaining ring of synthetic resin material, on the metallic holding body.

A further advantage produced with the design in accordance with the invention is that in the case of pulsating internal pressure loading normally occurring during operation, the resulting varying axial loading is taken up by the toothed engagement between the anchoring means and the retaining ring, the retaining ring being able, given a suitable design, to bear over a large area on the holding body. This means that shearing off and detachment at the point of anchoring engagement, as occurs in the prior art, is prevented when the anchoring means of the insert body directly cooperate with the metallic surface of the holding body.

Further advantageous developments of the invention are defined in the dependent claims.

The anchoring means provided on the insert body preferably consist of metal and may be designed in the form of a direct one-piece component of the insert body.

The anchoring means may for instance comprise a plurality of annular projections placed in sequence with an axial distance between them, which are more especially arranged respectively concentrically in relation to insert body and have a toothed shape. However, as has turned out, optimum anchoring engagement is ensured if the anchoring means biting into the holding body only consist of one annular radial projection.

The desired reliable anchoring of the retaining ring in the socket of the holding body may be ensured in a particularly simple manner if the retaining ring is set in an annular groove whose axially facing flanks are opposite to the axial end sides of the retaining ring so that the retaining ring may bear against same. It is in this manner that a particularly simple possibility is provided of holding the retaining ring only by frictional engagement at the flanks of the annular groove and without additional attachment measures such as bonding or press fitting or the like in the socket.

The fitting of the retaining ring in place is particularly simple if it is slotted at one point of its periphery so that it may be compressed elastically for insertion into the annular groove temporarily with a reduction of its external cross section. The retaining ring may for instance be inserted in the compressed state, it then expanding again on reaching the annular groove automatically and snapping into the annular groove. This fitting operation may be facilitated by providing a small degree of play between the retaining ring and the annular groove.

As a material for the retaining ring the use of an elastomeric material is recommended, particularly satisfactory results having been obtained with polyoxymethylene (POM).

An other particularly advantageous measure is such that the inner diameter of the outer section, to the fore of the retaining ring in the axial direction, of the socket is made larger than the inner diameter of the retaining ring in the fitted state, this being in conjunction with a further setting of the diameter such that the inner diameter of the above mentioned preceding outer section of the socket is the same as the outer diameter, defined by the anchoring means, of the insert body or preferably is somewhat larger than it. This means that during fitting by plugging of the insert body an excessively high load of the anchoring means owing to possible contact with the hard material of the holding body is prevented, it even being possible to prevent contact completely, something which reduces, or even completely excludes the danger of shearing off the anchoring means on press fitting the insert body.

For fixing the fluid line, which is to be connected, it is possible to provide holding means at the inner periphery of the insert body, for instance in the form of resiliently elastically movable claw elements, which after insertion of the fluid duct may act on the outer periphery thereof. A design which is advantageous in this case is such that the claw elements are designed as a component of an annular body attached to the insert body.

It is furthermore possible to provide a release body which is able to be moved more particularly axially, using which body it is possible to so act so manually on the holding means oppositely that same perform a release movement in the radially outward direction in order to release a previously inserted fluid duct.

Although it is in principle possible to design the connection device generally as a separate component group, which is then installed at the intended site of application, particular advantages are to be had more particularly if the holding body of the connection device is directly constituted by a component of a fluid power device, as for instance by the housing of such equipment.

In what follows an account will be given of the invention with reference to the accompanying drawings.

DETAILED DESCRIPTION OF THE PREFERRED EMBODIMENTS

Figure 1:
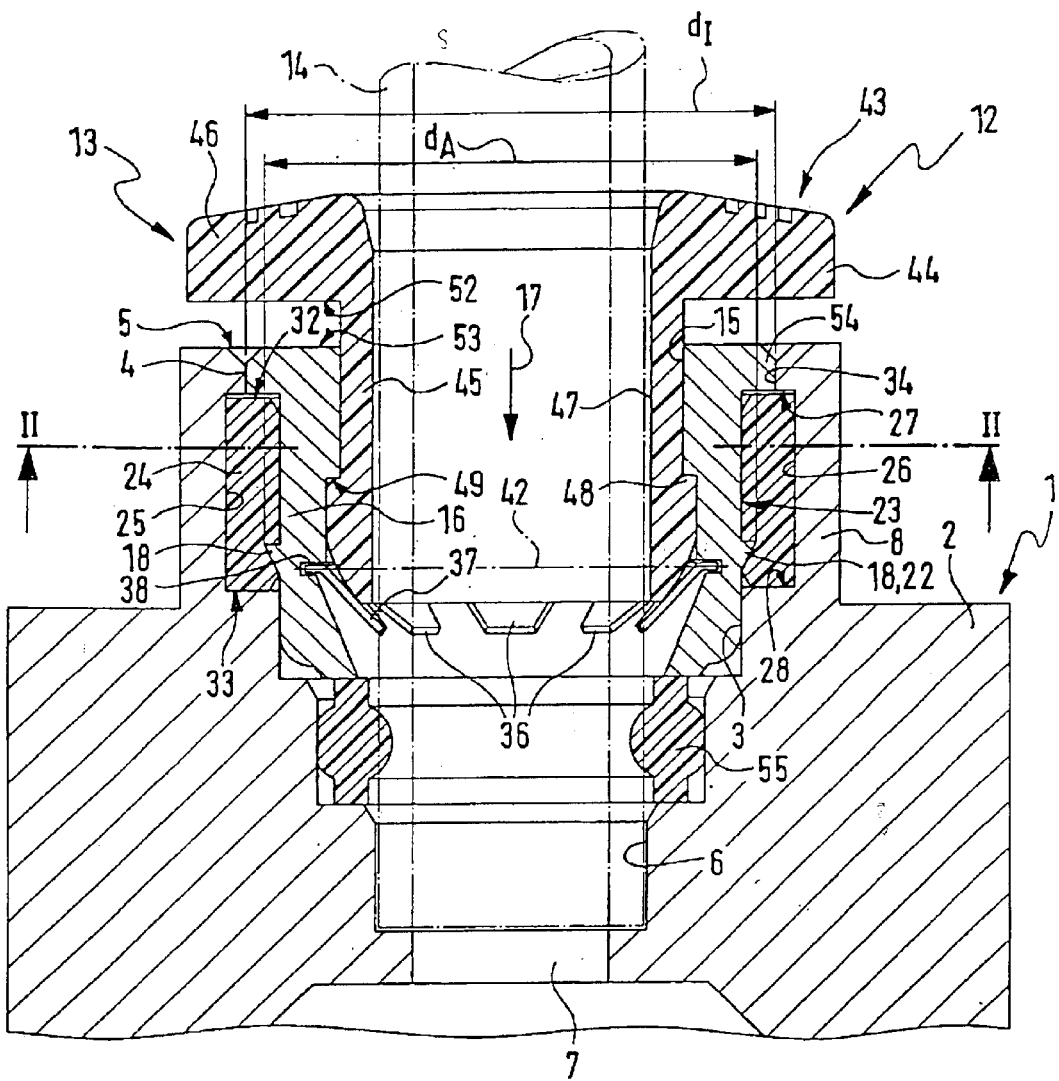
FIG. 1 shows a preferred embodiment of the connection device of the invention in a longitudinal section, chained lines indicating a fluid line connected with the connection device.

FIG. 1 shows a part of the housing 2 of fluid power equipment 1 of unspecified type, as for example of a valve or a drive operated by fluid power or some other means, which is operated in conjunction with a hydraulic or preferably a pneumatic pressure medium.

At least one cylindrical and possibly multiply stepped socket 3 is formed in the housing 2, such socket having its outer terminal portion 4 open toward an outer face 5 of the housing 2, which outer face 5 is constituted in the working embodiment by the terminal face of a collar-like projection of the housing 2.

The inner terminal region 6, placed further to the inside, of the socket 3 merges with a fluid duct 7, leading to other equipment, in the housing 2. This fluid duct 7 leads for instance, in the case of a fluid power device 1 constituted by a valve, to a valve chamber, which is provided with a valve member, not illustrated.

The housing 2 represents a holding body, which in the following will be referenced 8, for a connection unit generally referenced 12, together with which it defines a connection device 13, which then renders possible the preferably detachable connection of a fluid line 14 indicated in chained lines. This means that a fluid connection may be produced between the fluid line 14, which may as necessary be rigid or flexible, and the fluid duct 7. The connection of the fluid line 14 is in the working example performed extremely simply by coaxial insertion into the connection unit 12, by which it is held releaseably in the inserted state. In FIG. 1 this inserted state of the fluid line 14 is illustrated.

The holding body 8 and furthermore the wall delimiting the socket 3, are in the working example metallic and are more particularly of an injection cast aluminum material of the desired configuration, that is to say a material which is extremely frequently employed in fluid power equipment for the housings. Using such material and methods of forming it is possible to produce optimum configurations with the simultaneous provision of a relatively high strength.

The connection unit 12 has a sleeve-like insert body 16 having an axial passage 15 and which is locked on assembly by plugging in the direction 17 indicated by the arrow, in the socket 3. During fitting by plugging the insert body 16 is pressed into place by the application of a certain fitting force coaxially as indicated by the arrow 17 axially from the outside into the socket 3.

In the condition with the connection unit 12 mounted on the holding body 8 the insert body 16 is preferably fr its full axial length in the socket 3 and its end more particularly flush with the above mentioned outer face 5 of the holding body 8.

At its radially aligned outer periphery the insert body 16 possesses anchoring means 18 constituted by one or more radially outwardly extending projections, by means of which it is so held in the socket 3 with a toothed biting effect that falling out of the socket 3 is prevented. In the working embodiment illustrated the anchoring means 18 comprise an annular anchoring projection 22, which is concentric in relation to the insert body 16, and which has a sawtooth-like configuration, and which is adjoined axially on either side by cylindrical sections of the outer peripheral face 23 of the of the insert body 16, in relation to which it pprojects radially.

Figure 3:
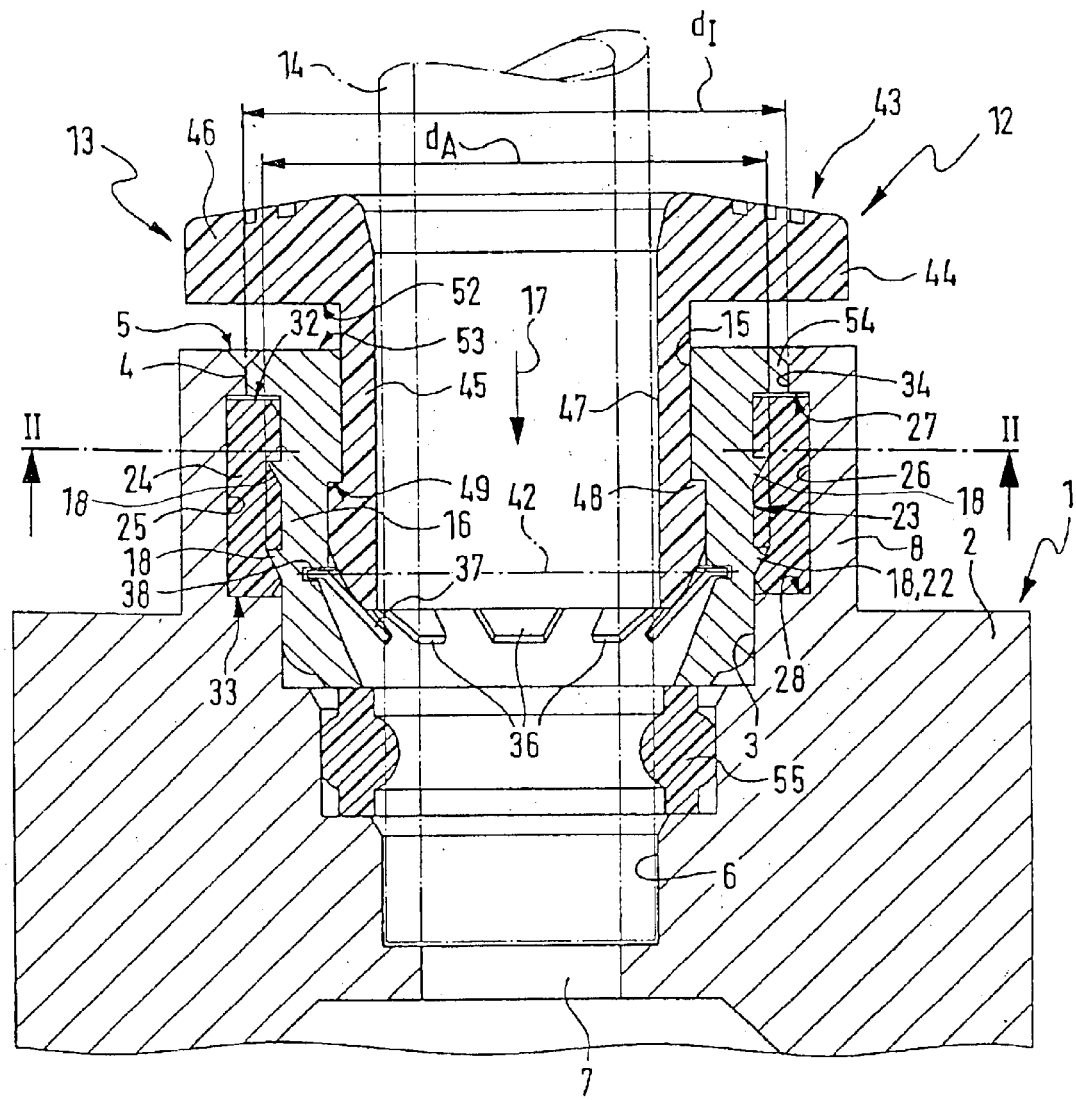
FIG. 3 shows another preferred embodiment of the connection device of the invention in a longitudinal section having a plurality of annular projections sequentially arranged an axial distance apart on the insert body.

In another preferred embodiment, a plurality of mutually coaxial annular anchoring projections are provided, which are arranged at an axial distance apart as shown in FIG. 3. However, it has turned out that a sufficient holding effect may be produced even with only one anchoring projection 22.

The insert body 16 is in the present working example a metallic body and preferably consists of brass material. The anchoring means 18 are best an integral part of the insert body 16 and accordingly consist in the working example of metal as well, something which permits the transmission of substantial tension forces.

The anchoring of the insert body 16 in the socket 3 is performed not by direct cooperation with the holding body 8, but rather by the intermediate arrangement of an additional component in the form of a retaining ring 24 consisting of synthetic resin material. This retaining ring 24 is arranged coaxially in the socket 3 and is locked in an annular groove 25 in the inner periphery of the socket 3 in the holding body 8.

The annular groove 25 possesses one radially inwardly facing cylindrical groove floor face 26 and two groove flanks 27 and 28 facing each other axially and defining the lateral limit of the groove 25. The groove flank, which is further to the outside in the axial direction in relation to the socket 3, will in the following be termed the outer groove flank 27, whereas the groove flank, which is further inward and is aligned axially in the outer direction, will be termed the inner groove flank 28.

The retaining ring 24, which preferably has a rectangular cross section, has its radially outwardly turned section seated in the annular groove 25, its two oppositely directed axial terminal faces 32 and 33 respectively facing one of the outer and, respectively, inner groove face 27 and 28. This means that the retaining ring 24 is prevented from moving to any substantial degree in relation to the holding body 8 and it is held in place by a virtual interlocking contact on the holding body 8 in the axial direction.

However in the working embodiment this feature means a slight degree of axial play, which is to be attributed to the manner of fitting of the retaining ring 24. Thus the retaining ring 24 in the working example is not molded in the annular groove 25, as would be possible in principle, for instance during injection molding. In fact the fitting of the retaining ring in place in the prefabricated state thereof in the fitting direction 17 is from the outside by snapping in place or by a detent action in the annular groove 25.

Figure 2:
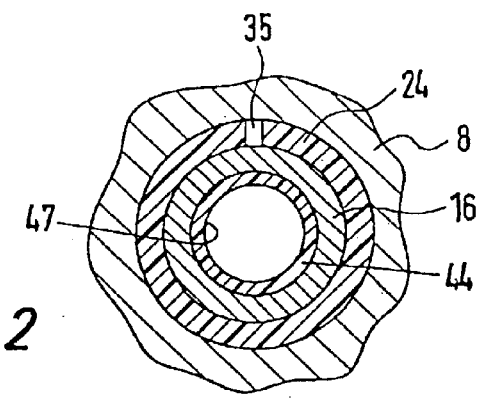
FIG. 2 shows a cross section taken through the connection device of FIG. 1 on the section line II—II thereof.

In order to ensure that the retaining ring 24 can be moved through the outer section 34, (coming axially in front toward the outer side of the socket 3) of the socket 3—the diameter of this outer section 34 is smaller than that of the groove's floor face 24—the retaining ring 24 is slotted at one point of its periphery as indicated in FIG. 2. The width of the radially and axially continuously extending slot 35 is so selected that the retaining ring 24 during fitting may be so compressed by the application of radial force temporarily, with a reduction in its outer periphery or, respectively, outer cross section, that it fits through the outer section 24 of the socket 3. When the retaining ring 24 after deformation in this fashion is fitted in the socket 3, it will expand again owing to the elasticity of its material with a renewed enlargement of the width 35 of the slot of its own accord so that it snap-fits into the annular groove 25 with a radial overlapping of the groove flanks 27 and 28.

The elastically resilient properties in the retaining ring 24 may be ensured without any trouble if the retaining ring 24 is manufactured of an elastomeric synthetic resin material, and more particularly of polyoxymethylene synthetic resin.

In the state fitted in the annular groove 25 the retaining ring 24 will project some distance proud of the inner peripheral face of the outer section 34 of the socket 3 radially outward.

The fitting by plugging of the insert body 16 in the socket 3 is performed after preceding fitting of the retaining ring 24 in the annular groove 25. For, this the outer periphery of the insert body 16 is preferably so matched to the inner periphery of the retaining ring 24 that a certain force is necessary for assembly by plugging, because the retaining ring is braced between the holding body 8 and the insert body 16. This means that there is a radially play-free seating of the insert body 16 in the socket 3.

During fitting by plugging of the insert body 16 the anchoring means 18 too are introduced into the retaining ring 24. Since they project beyond the outer peripheral face 23 in face to face contact with the inner peripheral face of the retaining ring 24 of the insert body 16, they fit into the synthetic resin material of the retaining ring 24 in a radially outward direction with an interlocki. The result is hence the effect of toothed engagement or bite, preventing the insert body 16 being pulled out of the retaining ring 24 in a direction opposite to the fitting direction 17. The tension forces transmitted by way of anchoring means 18 from the insert body 16 to the retaining ring 24 are ultimately taken up by the holding body 8, against which the retaining ring 24 may bear axially. The supporting effect at the two groove flanks 27 and 28 is then effective in both axial directions so that the retaining ring 24 is not only held by the interlocking effect from being pulled out of the socket 3, but also its axial depth of fitting is limited and it is held in the axial position, when the insert body 16 is press fitted coaxially.

Since the anchoring means 18 provided on the insert body 16 only bite into the synthetic resin material of the retaining ring 24 and do not cooperate with the harder metallic material of the holding body 18, it is possible to ensure that even in the case of pulsating pressure action in the fluid line 14 and hence accompanying small axial relative movements between the insert body 16 and the holding body 18 the desired bite or toothed engagement is maintained and pulling out is prevented.

Although it would in principle be possible to attach the retaining ring 14 by bonding for instance or by some other measures frictionally additionally in the socket 3, it is possible to do without such measures in the embodiment of the invention, something greatly simplifying assembly.

A further advantageous aspect results from the fact that the inner diameter $d_I$ of the outer section 34, axially to the front of the annular groove 25, of the socket 3 is not smaller than the outer diameter $d_A$, defined by the anchoring means 18, of the insert body 16. It is convenient for the inner diameter dI to be larger than the above mentioned outer diameter $d_A$ so that on insertion of the insert body 16 into the socket 3 it is possible to certainly exclude contact of the anchoring means 18 with the metallic parts of the holding body 8, such metallic part being in front of the retaining ring 24. This means that accidental shearing off of the anchoring means 18 is prevented, such anchoring means 18 generally being weaker owing to the selection of the material of same than the material of the holding body 8.

The connection unit 12 can have its insert body 16 directly and without the above noted holding ring 24 fitted in the socket 3 of a holding body consisting of synthetic resin material. For fitting the connection unit 12 in the socket 3 of a holding body 8 made of metal it is sufficient to fit the socket 3 in the above mentioned manner with a retaining ring 24 manufactured of synthetic resin material, the retaining ring 24 then providing for conditions at the contact point with the insert body 16 comparable to a synthetic resin holding body so that the connection unit 12 is suitable for fitting in a synthetic resin holding body or in a metal holding body as may be desired.

For holding the inserted fluid line 14 in the connection unit 12 the latter is provided with holding means 36 at the inner periphery of the insert body 16. Such holding means are in the working example constituted by resiliently elastic claw elements which are fixed to the insert body 16 though able to move in relation to the insert body 16, such elements being designed in the form of a component of an annular body 37, preferably consisting entirely of metal, which is held at an outer ring section 38 in a recess in the insert body 16 or is held in some other fashion on the insert body 16. The holding means 36 are bent outward out of the principal plane 42 of extent, indicated in chained lines, of the body 37 in the direction 17 of fitting and extend toward their free end obliquely radially inward and simultaneously in the fitting direction 17. Their free ends define an inner diameter of the ring body 37, which, considered when fluid line 14 is not inserted, is smaller than the outer diameter of such fluid line 14.

A fluid line 14 to be connected is introduced from the manipulating side 43, associated with outer axial terminal portion 4 of the socket 3, in the fitting direction 17 into the connection unit 12. At that time its terminal side touches the oblique rear side, facing against the direction 17 of fitting, of the holding means 36 are then pivoted radially outwardly so that the fluid line 14 is able to be inserted through the ring body 17. Owing to the resilient return force of the holding means 36 the fluid line 14 is then acted upon at its outer periphery by the holding means 36 with a sprag-like or claw-like action and is held. In this respect the free ends of the holding means 36 may engage the fluid line 14 in an interlocking manner.

In those cases, as in the present working example, in which the removal as required of a previously connected fluid line 14 is to be made possible, the connection unit 12 is provided with a release body 44. Same has a sleeve-like actuating section 45 extending from the manipulation side 43 into the axial passage 15 of the insert body 16. By way of contact with the actuating section 45 the release body 44 slides on the inner periphery of the insert body 16 axially. A handle section 46 connected with the actuating section 45, and for instance shaped like a flange, is located clear of the insert body 16 and is placed to the fore of same toward the manipulating side 43.

The release body 44 possesses a coaxial opening 47 which has a fluid line 14 extending through it.

The release body 44 runs into the interior of the insert body 16 as far as the rear side of the holding means 36. For removal of the fluid line 14 actuating force is applied manually on the manipulating section 46 in the same direction as the fitting direction 17 so that the release body 44 is moved forward in the fitting direction 17, it acting to the rear on the holding means 36 causing same to perform an outward radial pivotal movement, termed a release movement. The holding means 36 thus come out of engagement with the wall of the fluid line 14, which can therefore be pulled out of the connection unit 12.

It is convenient for the release body 44 to be tethered to the insert body 16 to prevent loss thereof. This is ensured for instance by providing one or more radially outward directed radial projections 48, which may hook onto a step 49 on the inner periphery of the insert body 16.

The insertion force necessary for pressing the insert body 16 into the socket 3 or, respectively, the retaining ring 24 may in the working example be applied to the manipulating section 46 of the release body 44. The latter is then initially inserted some distance into the insert body 16 until it contacts a support face 52 on the opposite terminal face 53 of the insert body 16 so that the pressing force is transmitted to the insert body 16.

The depth of insertion of the insert body 16 can for example be limited by an abutment collar 54 provided on the axially outer end of the insert body 16 and projecting radially past the outer peripheral face 23, which collar 54 on reaching the intended depth of fitting engages the axially outwardly facing terminal face 32 of the section, which projects radially inward past the annular groove 25, of the retaining ring 24.

Finally the connection device 13 is furthermore provided with a sealing means 55, which is for instance constituted by a single integral seal, said means 55 having a double function since on the one hand it seals on the holding body 8 and on the other hand it seals on the inserted fluid line 14. It is located preferably at a point placed axially and inwardly coaxially in relation to the insert body 16 in the interior of socket 3. The inserted fluid line 14 runs through the sealing means 55. While the sealing means 55 in the working embodiment is a separate component, it will be clear that it could also be designed in manner united with the insert body 16.

What is claimed is:

1. A connection device for a fluid duct comprising:
    a metallic holding body formed with a socket, said socket having an inner periphery formed with an annular groove;
    a sleeve-like insert body having an outer periphery and being configured to be plugged into said socket;
    a synthetic resin retaining ring being formed with a slot and substantially fixed in said annular groove so that said retaining ring will bear axially in both directions against said holding body; and
    an anchoring means for anchoring said insert body in said socket, said anchoring means including at least one projection provided on said outer periphery of said insert body biting into said retaining ring upon insertion of said insert body into said socket.

2. The connection device as set forth in claim 1, wherein the anchoring means is made from a metal.

3. The connection device as set forth in claim 1, wherein said anchoring means includes a plurality of annular projections sequentially arranged an axial distance apart on said insert body, each of said plurality of annular projections being concentric to said insert body and having a toothed shape.

4. The connection device as set forth in claim 1, wherein said annular groove is defined by an outer groove flank and an inner groove flank; and
    said retaining ring having axial terminal faces, each of said axial terminal faces being flanked by one of said outer groove flank and said inner groove flank.

5. The connection device as set forth in claim 1,
    wherein said retaining ring is fixed in said annular groove with a small degree of axial play.

6. The connection device as set forth in claim 1, wherein said retaining ring is made from an elastomeric material.

7. The connection device as set forth in claim 6, wherein said elastomeric material is polyoxmethylene.

8. The connection device as set forth in claim 1, wherein said insert body includes an inner periphery; and
    further comprising a holding means for a fluid line to be introduced within said insert body, said holding means being located at said an inner periphery of said insert body.

9. The connection device as set forth in claim 8, wherein said holding means comprise a plurality of inwardly projecting and resilient elastic claw elements positioned to peripherally act on the fluid line.

10. The connection device as set forth in claim 9, further comprising a release body capable of being translated in relation to said insert body to act on said holding means to perform a release movement.

11. The connection device as set forth in claim 1, further comprising an annular sealing means for sealing said holding body with a fluid line.

12. The connection device as set forth in claim 1, wherein the holding body is formed in a housing of a fluid power device.

13. The connection device as set forth in claim 1, wherein said annular groove has flanking portions; and
    said retaining ring is axially restrained by interlocking contact with said flanking portions of said annular groove.

14. A connection device for a fluid duct comprising:
    a metallic holding body having an outer section and being formed with a socket, said socket having an inner periphery formed with an annular groove, said inner periphery at said outer section having a first diameter and said inner periphery at said annular groove having a second diameter which is larger than said first diameter;

a sleeve-like insert body having an outer periphery and being configured to be plugged into said socket;

a synthetic resin retaining ring defined by a radius and formed with a slot having a width, said retaining ring being substantially fixed in said annular groove so that said retaining ring will bear axially in both directions against said holding body;

an anchoring means for anchoring said insert body in said socket, said anchoring means including at least one projection provided on said outer periphery of said insert body for biting into said retaining ring upon insertion of said insert body into said socket; and wherein said width of said slot is selected so that said retaining ring is capable of being compressed to reduce said radius temporarily for insertion through said outer section for mounting within said annular groove.

15. The connection device as set forth in claim 14, wherein said retaining ring is defined by an inner diameter; and said first diameter of said outer section is larger than said inner diameter of said retaining ring.

16. A connection device for a fluid duct comprising:

a metallic holding body formed with a socket, said socket having an inner periphery formed with an annular groove;

a sleeve-like insert body having an outer periphery and being configured to be plugged into said socket;

a synthetic resin retaining ring being substantially fixed in said annular groove so that said retaining ring will bear axially in both directions against said holding body; and an anchoring means for anchoring said insert body in said socket, said anchoring means including at least one projection provided on said outer periphery of said insert body biting into said retaining ring upon insertion of said insert body into said socket, wherein said retaining ring is fixed in said annular groove with a small degree of axial play.

17. The connection device as set forth in claim 16, wherein said insert body includes an inner periphery; and further comprising a holding means for a fluid line to be introduced within said insert body, said holding means being located at said an inner periphery of said insert body.

18. The connection device as set forth in claim 17, wherein said holding means comprise a plurality of inwardly projecting and resilient elastic claw elements positioned to peripherally act on the fluid line.

19. A connection device for a fluid duct comprising:

a metallic holding body formed with a socket, said socket having an inner periphery formed with an annular groove;

a sleeve-like insert body having an outer periphery and an inner periphery, said insert body being configured to be plugged into said socket;

a synthetic resin retaining ring being substantially fixed in said annular groove so that said retaining ring will bear axially in both directions against said holding body;

an anchoring means for anchoring said insert body in said socket, said anchoring means including at least one projection provided on said outer periphery of said insert body biting into said retaining ring upon insertion of said insert body into said socket; and a holding means for a fluid line to be introduced within said insert body, said holding means being located at said an inner periphery of said insert body.

20. The connection device as set forth in claim 19, wherein said holding means comprise a plurality of inwardly projecting and resilient elastic claw elements positioned to peripherally act on the fluid line.

21. The connection device as set forth in claim 20, further comprising a release body capable of being translated in relation to said insert body to act on said holding means to perform a release movement.

22. A connection device for a fluid duct comprising:

a metallic holding body formed with a socket, said socket having an inner periphery formed with an annular groove;

a sleeve-like insert body having an outer periphery and being configured to be plugged into said socket;

a synthetic resin retaining ring being substantially fixed in said annular groove so that said retaining ring will bear axially in both directions against said holding body; and an anchoring means for anchoring said insert body in said socket, said anchoring means including at least one projection provided on said outer periphery of said insert body biting into said retaining ring upon insertion of said insert body into said socket and preventing said insert body from being pulled out from said retaining ring.

23. The connection device as set forth in claim 22, wherein said insert body includes an inner periphery; and further comprising a holding means for a fluid line to be introduced within said insert body, said holding means being located at said an inner periphery of said insert body.

24. The connection device as set forth in claim 23, wherein said holding means comprise a plurality of inwardly projecting and resilient elastic claw elements positioned to peripherally act on the fluid line.

25. The connection device as set forth in claim 24, further comprising a release body capable of being translated in relation to said insert body to act on said holding means to perform a release movement.

* * * * *